United States Patent
Jeong et al.

(10) Patent No.: US 9,868,880 B2
(45) Date of Patent: Jan. 16, 2018

(54) ADHESIVE FILM FOR POLARIZING PLATE, POLARIZING PLATE INCLUDING THE SAME AND OPTICAL DISPLAY INCLUDING THE SAME

(71) Applicant: SAMSUNG SDI CO., LTD., Yongin-si, Gyeonggi-do (KR)

(72) Inventors: Woo Jin Jeong, Suwon-si (KR); In Cheon Han, Suwon-si (KR); Dong Heon Yun, Suwon-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 311 days.

(21) Appl. No.: 14/548,464

(22) Filed: Nov. 20, 2014

(65) Prior Publication Data

US 2015/0152293 A1    Jun. 4, 2015

(30) Foreign Application Priority Data

Nov. 29, 2013  (KR) ........................ 10-2013-0147955

(51) Int. Cl.
*C09J 7/00*    (2006.01)
*C09J 133/08*    (2006.01)
(Continued)

(52) U.S. Cl.
CPC ............... *C09J 7/00* (2013.01); *C09J 133/08* (2013.01); *B32B 37/003* (2013.01); *B32B 37/12* (2013.01); *B32B 2457/202* (2013.01); *C08K 5/21* (2013.01); *C08K 5/29* (2013.01); *C08K 5/5435* (2013.01); *C09J 2201/622* (2013.01);
(Continued)

(58) Field of Classification Search
None
See application file for complete search history.

(56) References Cited

U.S. PATENT DOCUMENTS 7,348,066 B2    3/2008  Chien et al.
2008/0143949 A1*  6/2008  Ino ................... G02F 1/133308
                                                    349/151
(Continued)

FOREIGN PATENT DOCUMENTS

CN    1708705 A    12/2005
CN    102559098 A    7/2012
(Continued)

OTHER PUBLICATIONS

Chinese Office Action dated May 27, 2016 in Corresponding Chinese Patent Application No. 201410698426.9.
(Continued)

*Primary Examiner* — Anthony J Frost
(74) *Attorney, Agent, or Firm* — Lee & Morse, P.C.

(57) ABSTRACT

An adhesive film for polarizing plates, a polarizing plate, and an optical display, the adhesive film being prepared from an adhesive composition including an isocyanate crosslinking agent and an imide crosslinking agent, and having a ΔG' of about 50% to about 80%, ΔG' being represented by Equation 1:

$$\Delta G'=(G1-G2)/G1\times 100 \qquad [\text{Equation 1}]$$

in which G1 is a storage modulus of the adhesive film for polarizing plates as measured at 25° C., and G2 is a storage modulus of the adhesive film for polarizing plates as measured at 85° C.

14 Claims, 2 Drawing Sheets

(51) Int. Cl.
*B32B 37/12* (2006.01)
*C08K 5/21* (2006.01)
*C08K 5/29* (2006.01)
*C08K 5/5435* (2006.01)
*B32B 37/00* (2006.01)

(52) U.S. Cl.
CPC .... *C09J 2203/318* (2013.01); *C09J 2205/102* (2013.01); *C09J 2433/00* (2013.01); *Y10T 156/10* (2015.01); *Y10T 428/1077* (2015.01); *Y10T 428/2891* (2015.01)

(56) References Cited

U.S. PATENT DOCUMENTS

| | | | |
|---|---|---|---|
| 2009/0068456 A1* | 3/2009 | Masuda | B41M 5/44 428/347 |
| 2009/0280322 A1* | 11/2009 | Daniels | C09J 133/04 428/354 |
| 2012/0171480 A1* | 7/2012 | Jeong | C09J 7/0246 428/343 |
| 2013/0005915 A1* | 1/2013 | Suzuki | C09J 7/0217 525/330.6 |
| 2013/0141879 A1* | 6/2013 | Tanaka | C08F 265/06 361/748 |

FOREIGN PATENT DOCUMENTS

| | | |
|---|---|---|
| CN | 103184019 A | 7/2013 |
| KR | 10-2009-0072868 A | 7/2009 |
| KR | 10-2009-0112916 A | 10/2009 |
| KR | 10-2012-0076267 A | 7/2012 |
| KR | 10-2013-0077702 A | 7/2013 |

OTHER PUBLICATIONS

Taiwanese Office action dated Nov. 27, 2015 for corresponding Taiwanese Patent Application No. 103141112. Woo Jin Jeong, et al.
Korean Office action dated Jan. 25, 2016 for Korean Application No. 10-2013-0147955; Jeong, et al.

* cited by examiner

ADHESIVE FILM FOR POLARIZING PLATE, POLARIZING PLATE INCLUDING THE SAME AND OPTICAL DISPLAY INCLUDING THE SAME

CROSS-REFERENCE TO RELATED APPLICATION

Korean Patent Application No. 10-2013-0147955, filed on Nov. 29, 2013, in the Korean Intellectual Property Office, and entitled: "Adhesive Film for Polarizing Plate, Polarizing Plate Including the Same and Optical Display Including the Same," is incorporated by reference herein in its entirety.

BACKGROUND

1. Field

Embodiments relate to an adhesive film for polarizing plates, a polarizing plate including the same, and an optical display including the same.

2. Description of the Related Art

A liquid crystal display (LCD) may be composed of a panel for LCDs including liquid crystals and a polarizing plate on the panel. The polarizing plate may be secured or adhered to the panel with an adhesive film for polarizing plates.

SUMMARY

Embodiments are directed to an adhesive film for polarizing plates, a polarizing plate including the same, and an optical display including the same.

The embodiments may be realized by providing an adhesive film for polarizing plates, the adhesive film being prepared from an adhesive composition including an isocyanate crosslinking agent and an imide crosslinking agent, and having a $\Delta G'$ of about 50% to about 80%, $\Delta G'$ being represented by Equation 1:

$$\Delta G' = (G1-G2)/G1 \times 100 \quad \text{[Equation 1]}$$

wherein G1 is a storage modulus of the adhesive film for polarizing plates as measured at 25° C., and G2 is a storage modulus of the adhesive film for polarizing plates as measured at 85° C.

G2 of the adhesive film may be about $1.0 \times 10^4$ Pa to about $1.0 \times 10^5$ Pa.

G2 of the adhesive film may be about $2.5 \times 10^4$ Pa to about $4.0 \times 10^4$ Pa.

The isocyanate crosslinking agent may include a modified polyisocyanate of hexamethylene diisocyanate.

The imide crosslinking agent may include an isocyanate group.

The adhesive composition may include the isocyanate crosslinking agent; the imide crosslinking agent; a first (meth)acrylic copolymer, the first (meth)acrylic copolymer having a weight average molecular weight of about 300,000 g/mol to about 700,000 g/mol, and a glass transition temperature (Tg) of about −50° C. to about −40° C.; and a second (meth)acrylic copolymer, the second (meth)acrylic copolymer having a weight average molecular weight of about 100,000 g/mol to about 300,000 g/mol, and a glass transition temperature (Tg) of about −10° C. to about 0° C.

The first (meth)acrylic copolymer may be a copolymer of a monomer mixture including an alkyl group-containing (meth)acrylic monomer, a hydroxyl group-containing (meth)acrylic monomer, an aromatic group-containing (meth)acrylic monomer, and a nitrogen-containing vinyl monomer, and the second (meth)acrylic copolymer may be a copolymer of a monomer mixture including an alkyl group-containing (meth)acrylic monomer, a hydroxyl group-containing (meth)acrylic monomer, an aromatic group-containing (meth)acrylic monomer, and a nitrogen-containing vinyl monomer.

When the glass transition temperature of the first (meth)acrylic copolymer in Kelvin is X and the glass transition temperature of the second (meth)acrylic copolymer in Kelvin is Y, $(Y-X)/Y$ may be about 0.1 to about 0.15.

A difference between the weight average molecular weight of the first (meth)acrylic copolymer and the weight average molecular weight of the second (meth)acrylic copolymer may be about 50,000 g/mol to about 500,000 g/mol.

The adhesive composition may further include an epoxy group-containing silane coupling agent.

The monomer mixture of the first (meth)acrylic copolymer may further include (meth)acrylic acid, and the monomer mixture of the second (meth)acrylic copolymer may further include (meth)acrylic acid.

The first (meth)acrylic copolymer may have an acid value from about 1.5 mg/KOH to about 5.0 mg/KOH, and the second (meth)acrylic copolymer may have an acid value from about 1.5 mg/KOH to about 5.0 mg/KOH.

The embodiments may be realized by providing a polarizing plate comprising the adhesive film for polarizing plates according to an embodiment.

The embodiments may be realized by providing an optical display including a liquid crystal display panel; a light source; a first polarizing plate on one surface of the liquid crystal display panel; and a second polarizing plate on another surface of the liquid crystal display panel, the second polarizing plate being between the liquid crystal display panel and the light source, wherein the liquid crystal display panel includes an upper substrate, a lower substrate, and a liquid crystal cell layer enclosed between the upper and lower substrates, the liquid crystal display panel has a thickness of about 0.05 mm to about 5 mm, and at least one of the first polarizing plate and the second polarizing plate includes the adhesive film for polarizing plates according to an embodiment.

The embodiments may be realized by providing a method of manufacturing optical display, the method including providing a liquid crystal display panel; providing a light source at one side of the liquid crystal display panel; providing a first polarizing plate on one surface of the liquid crystal display panel; and providing a second polarizing plate on another surface of the liquid crystal display panel, the second polarizing plate being between the liquid crystal display panel and the light source, wherein at least one of the first polarizing plate and the second polarizing plate includes the adhesive film for polarizing plates according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "(meth)acryl" may refer to acryl and/or methacryl, and the term "(meth)acrylate" may refer to acrylates and/or methacrylates. As used herein, terms such as "upper" and "lower" are defined with reference to the accompanying drawings. Thus, it will be understood that the term "upper side" may be used interchangeably with the term "lower side". As used herein, "storage modulus" refers to a value that is measured using a rheometer through temperature sweep testing at a temperature from 25° C. to 120° C. and a frequency of 1 Hz, for a specimen of an adhesive film for polarizing plates prepared by applying an adhesive composition for polarizing plates to a release film (e.g., a polyethylene terephthalate film), curing the applied adhesive composition at 35° C./45% RH, and stacking the cured adhesive layers one above another to a thickness of 0.8 mm.

The embodiments provide an adhesive film for polarizing plates. Hereinafter, an adhesive film for polarizing plates according to an embodiment will be described in detail. In an implementation, the adhesive film for polarizing plates may be used to secure a polarizing plate to a polarizer, or an optical display panel, when an optical film is formed on at least one surface of the polarizer. In an implementation, the adhesive film may have $\Delta G'$ of about 50% or more represented by Equation 1:

$$\Delta G' = (G1 - G2)/G1 \times 100 \qquad \text{[Equation 1]}$$

In Equation 1, G1 is a storage modulus of the adhesive film for polarizing plates as measured at 25° C., and G2 is a storage modulus of the adhesive film for polarizing plates as measured at 85° C.

The adhesive film for polarizing plates according to an embodiment may have a lower storage modulus at 85° C. than at 25° C. The adhesive film for polarizing plates according to an embodiment may also exhibit $\Delta G'$ of about 50% or more. Accordingly, cutability at room or ambient temperature may be improved, and contraction of the polarizing plate may be absorbed to help suppress bending while providing high durability under heat resistance, moist-heat resistance, or thermal shock conditions. In an implementation, $\Delta G'$ may be about 50% to about 80%, e.g., about 55% to about 75%. Within this range, the adhesive film may help suppress bending of the adhesive film at high temperature, and may exhibit excellent durability under heat resistance, moist-heat resistance, or thermal shock conditions.

In an implementation, $\Delta G'$ may be about, e.g., 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%. Within this range, the adhesive film may help suppress bending of the adhesive film at high temperature, and may exhibit excellent durability under heat resistance, moist-heat resistance, or thermal shock conditions.

In an implementation, G1 may be about $5.0 \times 10^4$ Pa to about $5.0 \times 10^5$ Pa, e.g., about $7.0 \times 10^4$ Pa to about $2.0 \times 10^5$ Pa. Within this range, the adhesive film may help improve cutability of the polarizing plate at room or ambient temperature.

In an implementation, G2 may be about $1.0 \times 10^4$ Pa to about $1.0 \times 10^5$ Pa, e.g., about $2.5 \times 10^4$ Pa to about $4.0 \times 10^4$ Pa. Within this range, the adhesive film may help minimize bending of the polarizing plate at high temperature and may help improve light leakage characteristics.

The adhesive film for polarizing plates according to an embodiment may be prepared using an adhesive composition for polarizing plates. Hereinafter, an adhesive composition for polarizing plates according to an embodiment will be described in detail.

For example, the adhesive composition for polarizing plates may include an isocyanate crosslinking agent and an imide crosslinking agent. In an implementation, the adhesive composition for polarizing plates according to an embodiment may include, e.g., (A) a first (meth)acrylic copolymer (e.g., soft type) having a weight average molecular weight of about 300,000 g/mol to about 700,000 g/mol and a glass transition temperature (Tg) of about −40° C. or less, (B) a second (meth)acrylic copolymer (e.g., hard type) having a weight average molecular weight of about 100,000 g/mol to about 300,000 g/mol and a glass transition temperature (Tg) of about −10° C. or more, (C) the isocyanate crosslinking agent, and (D) the imide crosslinking agent.

The first and second (meth)acrylic copolymers may differ in weight average molecular weight and Tg. For example, the first and second (meth)acrylic copolymers may have a difference in weight average molecular weight and Tg within specific ranges. Accordingly, durability may be improved while also suppressing bending due to reduction in modulus at high temperature. In an implementation, a difference in weight average molecular weight between the first and second (meth)acrylic copolymers may be about 50,000 g/mol to about 500,000 g/mol, e.g., about 100,000 g/mol to about 350,000 g/mol. A difference in Tg between the first and second (meth)acrylic copolymers may be about 30° C. to about 40° C., thereby improving durability while suppressing bending.

For example, in the adhesive composition for polarizing plates according to an embodiment, when a (meth)acrylic copolymer having a higher weight average molecular weight has a glass transition temperature of Tg1 and a (meth)acrylic copolymer having a lower weight average molecular weight has a glass transition temperature of Tg2, Tg1 and Tg2 may satisfy the following relation: Tg1<Tg2, which may provide $\Delta G'$ of about 50% or more, and may help suppress bending at high temperature, and may help improve light leakage characteristics.

An average value of the weight average molecular weights of the first and second (meth)acrylic copolymers may be about 600,000 g/mol or less, e.g., about 400,000 g/mol to about 600,000 g/mol. Within this range, the adhesive composition may provide reduced modulus at high temperature. A widened polydispersity index of the first and second (meth)acrylic copolymers of about 4.5 to about 8.0, e.g., about to 6.0 to about 8.0, as measured by gel permeation chromatography (GPC), may help relieve stress due to increase in temperature.

When a value obtained by converting the glass transition temperature of the first (meth)acrylic copolymer into Kelvin is X (i.e., when X is the glass transition temperature of the first (meth)acrylic copolymer in K) and a value obtained by converting the glass transition temperature of the second (meth)acrylic copolymer into Kelvin is Y (i.e., when Y is the glass transition temperature of the second (meth)acrylic copolymer in Kelvin), (Y−X)/Y may be about 0.1 or more. Within this range, the adhesive composition may help suppress bending of the adhesive film at high temperature while improving light leakage characteristics. In an implementation, (Y−X)/Y may be about 0.1 to about 0.15. In an implementation, (Y−X)/Y may be about, e.g., 0.1, 0.11, 0.12, 0.13, 0.14, or 0.15.

The first (meth)acrylic copolymer may help provide high durability to the adhesive film for polarizing plates under heat resistance, moist-heat resistance, or thermal shock conditions. In an implementation, the first (meth)acrylic copolymer may have a weight average molecular weight of about 300,000 g/mol to about 700,000 g/mol, e.g., about 500,000 g/mol to about 600,000 g/mol, and may have a glass transition temperature (Tg) of about −50° C. to about −40° C., e.g., about −46° C. to about −40° C. Within this range, the adhesive composition may exhibit improved durability.

The first (meth)acrylic copolymer may have a polydispersity index of about 4.5 to about 6.0. Within this range, the adhesive composition may exhibit improved durability. In an implementation, the first (meth)acrylic copolymer may have a polydispersity index of about 5.0 to about 5.5. In an implementation, the first (meth)acrylic copolymer may have a polydispersity index of about, e.g., 4.5, 4.6, 4.7, 4.8, 4.9, 5.0, 5.1, 5.2, 5.3, 5.4, 5.5, 5.6, 5.7, 5.8, 5.9, or 6.0.

The second (meth)acrylic copolymer may help improve durability of the adhesive film for polarizing plates under moist-heat resistance conditions and thermal shock, and may help reduce storage modulus at high temperature, which may help suppress bending of the adhesive film. In an implementation, the second (meth)acrylic copolymer may have a weight average molecular weight of about 100,000 g/mol to about 300,000 g/mol, e.g., about 200,000 g/mol to about 250,000 g/mol, and a glass transition temperature (Tg) of about −10° C. to about 0° C., e.g., about −10° C. to about −5° C. Within this range, the adhesive composition may help relieve stress at high temperature.

The second (meth)acrylic copolymer may have a polydispersity index of about 4.5 to about 6.0. Within this range, the adhesive composition may help relieve stress at high temperature. In an implementation, the second (meth)acrylic copolymer may have a polydispersity index of about 5.0 to about 5.5. In an implementation, the second (meth)acrylic copolymer may have a polydispersity index of about, e.g., 4.5, 4.6, 4.7, 4.8, 4.9, 5.0, 5.1, 5.2, 5.3, 5.4, 5.5, 5.6, 5.7, 5.8, 5.9, or 6.0.

The second (meth)acrylic copolymer (B) may be present in the composition in an amount of about 50 parts by weight or more, based on 100 parts by weight of the first (meth)acrylic copolymer (A) and the second (meth)acrylic copolymer (B). Within this range, the adhesive composition may help suppress bending of the adhesive film at high temperature and may help improve durability. In an implementation, the second (meth)acrylic copolymer (B) may be present in an amount of, e.g., about 50 parts by weight to about 99 parts by weight.

In an implementation, the first (meth)acrylic copolymer (A) may be present in the composition in an amount of about 20 parts by weight to about 50 parts by weight, based on 100 parts by weight of the first (meth)acrylic copolymer (A) and the second (meth)acrylic copolymer (B). Within this range, the adhesive composition may help improve durability under heat resistance, moist-heat resistance, or thermal shock conditions, and may help suppress bending of the adhesive film at high temperature. In an implementation, the first (meth)acrylic copolymer may be present in an amount of about 25 parts by weight to about 50 parts by weight. In an implementation, the first (meth)acrylic copolymer may be present in an amount of about, e.g., 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, and the second (meth)acrylic copolymer (B) may be present in an amount of about 50 parts by weight to about 80 parts by weight. Within this range, the adhesive composition may help improve durability under heat resistance, moist-heat resistance, or thermal shock conditions, and may help suppress bending of the adhesive film at high temperature. In an implementation, the second (meth)acrylic copolymer may be present in an amount of about 50 parts by weight to about 75 parts by weight. In an implementation, the second (meth)acrylic copolymer may be present in an amount of about, e.g., 50 parts by weight, 51 parts by weight, 52 parts by weight, 53 parts by weight, 54 parts by weight, 55 parts by weight, 56 parts by weight, 57 parts by weight, 58 parts by weight, 59 parts by weight, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight, or 80 parts by weight.

The first (meth)acrylic copolymer may include about 0.1% by weight (wt %) to about 5 wt % of (e.g., repeating units of) a cross-linkable functional group-containing monomer (e.g., a hydroxyl group-containing (meth)acrylic monomer) to help improve durability by curing reaction. For example, the first (meth)acrylic copolymer may include about 2 wt % to about 5 wt % of (e.g., repeating units of) the cross-linkable functional group-containing monomer. In an implementation, each of the first and second (meth)acrylic copolymers may independently be a copolymer of a monomer mixture including an alkyl group-containing (meth)acrylic monomer, a hydroxyl group-containing (meth)acrylic monomer, an aromatic group-containing (meth)acrylic monomer, and a nitrogen-containing vinyl monomer.

The alkyl group-containing (meth)acrylic monomer may be a $C_1$ to $C_{20}$ alkyl group-containing (meth)acrylic acid ester. In an implementation, the alkyl group-containing (meth)acrylic monomer may include, e.g., methyl (meth)acrylate, ethyl (meth)acrylate, propyl (meth)acrylate, n-butyl (meth)acrylate, t-butyl (meth)acrylate, isobutyl (meth)acrylate, pentyl (meth)acrylate, hexyl (meth)acrylate, or 2-ethylhexyl (meth)acrylate. These may be used alone or in combination thereof.

The hydroxyl group-containing (meth)acrylic monomer may be a $C_2$ to $C_{20}$ alkyl group-containing (meth)acrylic acid ester having a hydroxyl group, a $C_5$ to $C_{20}$ cycloalkyl group-containing (meth)acrylic acid ester having a hydroxyl group, or a $C_6$ to $C_{20}$ aryl group-containing (meth)acrylic acid ester having a hydroxyl group. In an implementation, the hydroxyl group-containing (meth)acrylic monomer may include, e.g., 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono (meth)acrylate, or 1-chloro-2-hydroxypropyl (meth)acrylate. These may be used alone or in combination thereof.

The aromatic group-containing (meth)acrylic monomer may have a high refractive index, and may help reduce modulus at high temperature. In an implementation, the aromatic group-containing (meth)acrylic monomer may be a monomer represented by the following Formula 1.

[Formula 1]

In Formula 1, $R_1$ may be hydrogen or a methyl group; p may be an integer of 0 to 10; and $R_2$ may be at least one of a phenoxy group, a phenyl group, a methylphenyl group, a methylethylphenyl group, a methoxyphenyl group, a propylphenyl group, cyclohexylphenyl group, chlorophenyl group, a bromophenyl group, a phenylphenyl group, a benzyl group, and a benzylphenyl group.

The aromatic group-containing (meth)acrylic monomer may include, e.g., phenoxyethyl (meth)acrylate, phenyl (meth)acrylate, phenoxy (meth)acrylate, 2-ethylphenoxy (meth)acrylate, benzyl (meth)acrylate, 2-phenylethyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenyl-phenyl)ethyl (meth)acrylate, or 2-(4-benzylphenyl)ethyl (meth)acrylate. These may be used alone or in combination thereof.

The nitrogen-containing vinyl monomer may be a pyrrolidone group-containing vinyl monomer, e.g., N-vinylpyrrolidone.

The monomer mixture for the first and second (meth)acrylic copolymers may each further include a carboxylic acid group-containing vinyl monomer to have an acid value of about 1.5 mg/KOH or higher. In an implementation, the monomer mixture may have an acid value of about 1.5 mg/KOH to about 5.0 mg/KOH, e.g., about 2.0 mg/KOH to about 3.0 mg/KOH. Within this range, the adhesive composition may exhibit improved durability. In an implementation, the monomer mixture may have an acid value of about, e.g., 1.5 mg/KOH, 1.6 mg/KOH, 1.7 mg/KOH, 1.8 mg/KOH, 1.9 mg/KOH, 2 mg/KOH, 2.1 mg/KOH, 2.2 mg/KOH, 2.3 mg/KOH, 2.4 mg/KOH, 2.5 mg/KOH, 2.6 mg/KOH, 2.7 mg/KOH, 2.8 mg/KOH, 2.9 mg/KOH, 3.0 mg/KOH, 3.5 mg/KOH, 4.0 mg/KOH, 4.5 mg/KOH, or 5.0 mg/KOH. In an implementation, the first (meth)acrylic copolymer and/or the second (meth)acrylic copolymer may have an acid value of about 1.5 mg/KOH or higher, e.g., about 1.5 mg/KOH to about 5.0 mg/KOH.

In an implementation, the carboxylic acid group-containing vinyl monomer may be (meth)acrylic acid, and may be present in an amount of about 1 wt % to about 5 wt % in the monomer mixture.

In an implementation, the first (meth)acrylic copolymer may be a copolymer of a monomer mixture including about 65 wt % to about 90 wt %, e.g., about 80 wt % to about 90 wt %, of the alkyl group-containing (meth)acrylic monomer, about 0.1 wt % to about 5 wt %, e.g., about 2 wt % to about 5 wt %, of the hydroxyl group-containing (meth)acrylic monomer, about 1 wt % to about 15 wt %, e.g., about 1 wt % to about 6 wt %, of the aromatic group-containing (meth)acrylic monomer, about 1 wt % to about 20 wt %, e.g., about 1 wt % to about 6 wt %, of the nitrogen-containing vinyl monomer, and about 1 wt % to about 5 wt %, e.g., about 1 wt % to about 3 wt %, of the carboxylic acid group-containing vinyl monomer. Within this range, the adhesive film may have high durability and may help suppress bending of the adhesive film at high temperature.

The second (meth)acrylic copolymer may be a copolymer of a monomer mixture including about 50 wt % to about 90 wt %, e.g., about 65 wt % to about 70 wt %, of the alkyl group-containing (meth)acrylic monomer, about 0.1 wt % to about 5 wt %, e.g., about 1 wt % to about 5 wt %, of the hydroxyl group-containing (meth)acrylic monomer, about 1 wt % to about 20 wt %, e.g., about 10 wt % to about 15 wt %, of the aromatic group-containing (meth)acrylic monomer, about 1 wt % to about 20 wt %, e.g., about 10 wt % to about 20 wt %, of a nitrogen-containing vinyl monomer, and about 1 wt % to about 5 wt %, e.g., about 3 wt % to about 5 wt %, of the carboxylic acid group-containing vinyl monomer. Within this range, the adhesive film may have high durability and may help suppress bending of the adhesive film at high temperature.

The (meth)acrylic copolymer may be prepared by, e.g., solution polymerization, photopolymerization, bulk polymerization, or emulsion polymerization. In an implementation, the (meth)acrylic copolymer may be prepared by solution polymerization at a polymerization temperature of about 50° C. to about 140° C. for a polymerization time of about 5 hours to about 24 hours. Upon or for polymerization, suitable initiators may be used.

For example, the polymerization initiator may include azo-based polymerization initiators such as azobisisobutyronitrile and azobiscyclohexanecarbonitrile; and/or peroxides such as benzoyl peroxide and acetyl peroxide, or the like. In an implementation, the initiator may be present in an amount of about 0.01 parts by weight to about 10 parts by weight, based on 100 parts by weight of the alkyl group-containing (meth)acrylic monomer. Within this range, the copolymers may be sufficiently polymerized. Upon or for polymerization, a suitable solvent may be used. For example, the solvent may include ethyl acetate and/or methylethylketone.

The isocyanate crosslinking agent may crosslink the first and second (meth)acrylic copolymers. In an implementation, the isocyanate crosslinking agent may include a polyfunctional crosslinking agent having two or more, e.g., two or three isocyanate groups, to help improve durability of the adhesive film. In an implementation, the isocyanate crosslinking agent may include a crosslinking agent having long alkylene chains between isocyanate groups or a partially end-capped crosslinking agent to help increase flexibility by reducing modulus of the adhesive film.

In an implementation, the isocyanate crosslinking agent may include at least one of modified polyisocyanate of hexamethylene diisocyanate (in which "modified" refers to a structure in which an isocyanate group is bonded to a polyhydric alcohol, e.g., adducts of hexamethylene diisocyanate with trimethylolpropane) and a polyisocyanate crosslinking agent that is partially end-capped with a $C_1$ to $C_3$ alcohol group. The crosslinking agents may help reduce modulus of the adhesive film.

Examples of the polyisocyanate crosslinking agent may include 2,4-tolylene diisocyanate, 2,6-tolylene diisocyanate, hydrogenated tolylene diisocyanate, 1,3-xylene diisocyanate, 1,4-xylene diisocyanate, diphenylmethane-4,4-diisocyanate, 1,3-bis(isocyanatomethyl)cyclohexane, tetramethylxylene diisocyanate, 1,5-naphthalene diisocyanate, hexamethylene diisocyanate, 2,2,4-trimethylhexamethylene diisocyanate, 2,4,4-trimethylhexamethylene diisocyanate, adducts of tolylene diisocyanate with trimethylolpropane, adducts of xylene diisocyanate with trimethylolpropane, triphenylmethanetriisocyanate, and methylenebis(phenylisocyanate). The alcohol may be a $C_3$ to $C_{12}$ alcohol, e.g., propanol.

The isocyanate crosslinking agent may be present in the composition in an amount of about 0.1 parts by weight to about 5 parts by weight, based on 100 parts by weight of the first (meth)acrylic copolymer (A) and the second (meth) acrylic copolymer (B). Within this range, the adhesive composition may help reduce modulus of the adhesive film for polarizing plates at high temperature, as compared with other compositions. For example, the isocyanate crosslinking agent may be present in an amount of about 3 parts by weight to about 5 parts by weight. In an implementation, the isocyanate crosslinking agent may be present in an amount of about, e.g., 3 parts by weight, 3.5 parts by weight, 4 parts by weight, 4.5 parts by weight, or 5 parts by weight, based on 100 parts by weight of the first (meth)acrylic copolymer (A) and the second (meth)acrylic copolymer (B). Within this range, the adhesive composition may help reduce modulus of the adhesive film for polarizing plates at high temperature, as compared with other compositions.

The imide crosslinking agent may help increase a curing rate and may include, e.g., a carbodiimide crosslinking agent. In an implementation, the imide crosslinking agent may further include an isocyanate group to help increase the curing rate.

The imide crosslinking agent may be present in the composition in an amount of about 0.01 parts by weight to about 1 parts by weight, based on 100 parts by weight of the first (meth)acrylic copolymer (A) and the second (meth) acrylic copolymer (B). Within this range, the adhesive film for polarizing plates may help increase the curing rate and the degree of curing. For example, the imide crosslinking agent may be present in an amount of about 0.01 parts by weight to about 0.1 parts by weight. In an implementation, the imide crosslinking agent may be present in an amount of about, e.g., 0.02 parts by weight, 0.04 parts by weight, 0.06 parts by weight, 0.08 parts by weight, or 0.1 parts by weight.

In an implementation, a weight ratio of the isocyanate crosslinking agent to the imide crosslinking agent may be about 10:1 to about 200:1, e.g., about 50:1 to about 100:1.

The adhesive composition for polarizing plates may further include a silane coupling agent. The silane coupling agent included in the adhesive composition may help improve durability of the adhesive film for polarizing plates under heat resistance conditions and moist-heat resistance conditions.

The silane coupling agent may be include a suitable silane coupling agent, e.g., epoxy group-containing silicon compounds, such as 3-glycidoxypropyltrimethoxysilane, 3-glycidoxypropylmethyldimethoxysilane, 2-(3,4-epoxycyclohexyl)ethyltrimethoxysilane, and the like; polymerizable unsaturated group-containing silicon compounds, such as vinyltrimethoxysilane, vinyltriethoxysilane, (meth)acryloxypropyltrimethoxysilane, and the like; amino group-containing silicon compounds, such as 3-aminopropyltrimethoxysilane, N-(2-aminoethyl)-3-aminopropyltrimethoxysilane, N-(2-aminoethyl)-3-aminopropylmethyldimethoxysilane, and the like; and 3-chloropropyltrimethoxysilane. In an implementation, an epoxy group-containing silane coupling agent may be used to help increase durability and adhesion of the adhesive composition.

The silane coupling agent may be present in the composition in an amount of about 0.1 parts by weight to about 1 parts by weight, based on 100 parts by weight of the first (meth)acrylic copolymer (A) and the second (meth)acrylic copolymer (B). Within this range, the adhesive film may exhibit excellent durability. For example, the silane coupling agent may be present in an amount of about 0.1 parts by weight to about 0.2 parts by weight.

The adhesive composition for polarizing plates may further include a solvent. The solvent may include, e.g., methylethylketone. The adhesive composition for polarizing plates may further include a suitable additive, e.g., a UV absorber, an antioxidant, or the like.

The adhesive composition for polarizing plates may have a viscosity of about 1,000 cPs to about 3,000 cPs as measured at 25° C. Within this range, the adhesive film may be easily adjusted in terms of thickness, may avoid smearing, and may be uniformly coated.

The adhesive film for polarizing plates may be prepared by drying and/or aging the adhesive composition. For example, aging may include thermal curing and storage at about 20° C. to about 35° C. for about 1 hour to about 1 week. For example, the adhesive film may be prepared by coating the adhesive composition onto a release film (e.g., a polyethylene terephthalate film), followed by drying and curing at about 20° C. to about 35° C.

The adhesive film for polarizing plates may have a thickness of about 5 μm to about 30 μm. Within this range, the adhesive film may be used as an adhesive film for polarizing plates. In an implementation, the adhesive film for polarizing plates may have a thickness of about, e.g., 5 μM, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm.

Another embodiment may provide a polarizing plate. The polarizing plate may include an adhesive layer (including the adhesive film for polarizing plates, e.g., prepared from the adhesive composition for polarizing plates as set forth above). Hereinafter, the polarizing plate according to an embodiment will be described in detail with reference to FIG. 1.

Figure 1:
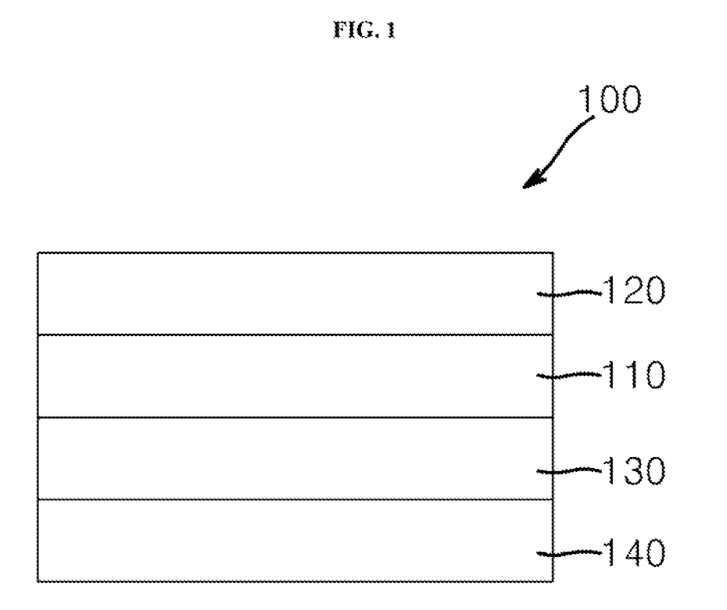
FIG. 1 illustrates a sectional view of a polarizing plate according to an embodiment.

Referring to FIG. 1, the polarizing plate 100 according to the present embodiment may include a polarizer 110; a first protective film 120 on an upper surface of the polarizer 110; a second protective film 130 on a lower surface of the polarizer 110 (e.g., surface of the polarizer 110 that is opposite to the upper surface of the polarizer 110); and an adhesive film for polarizing plates 140 on a lower surface of the second protective film 130 (e.g., a surface of the second protective film 130 that is opposite to the surface thereof facing the polarizer 110). The adhesive film 140 may include the adhesive film prepared from the adhesive composition for polarizing plates according to an embodiment.

The polarizer may include a suitable polyvinyl alcohol film for polarizing plates, irrespective of manufacturing process thereof. For example, the polyvinyl alcohol film may include a modified polyvinyl alcohol film, such as a partially formalized polyvinyl alcohol film, acetoacetyl group modified polyvinyl alcohol film, and the like. In an implementation, the polarizer may be prepared by dyeing a polyvinyl alcohol film with iodine or dichroic dye, followed by stretching in a predetermined direction. In an implementation, the polarizer may be prepared through swelling, dyeing, and stretching. Suitable methods may be used to carry out each of these processes. The polarizer may have a thickness of, e.g., about 10 µm to about 50 µm. Within this range, the polarizer may be used in optical displays.

In an implementation, each of the first and second protective films may be stacked on one side of the polarizer. The first and second protective films may be the same or different films, and may be cyclic polyolefin films including amorphous cycloolefin polymer (COP), poly(meth)acrylate films, polycarbonate films, polyester films including polyethylene terephthalate (PET), polyethersulfone films, polysulfone films, polyamide films, polyimide films, polyolefin films, polyarylate films, polyvinyl alcohol films, polyvinyl chloride films, polyvinylidene chloride films, or mixtures thereof. Each of the first and second protective films may have a thickness of about 10 µm to about 200 µm, e.g., from about 30 µm to about 120 µm. Within this range, the first and second protective films may be used in optical displays.

The adhesive film may be prepared by coating the adhesive composition onto one surface of the protective film, followed by drying and/or curing. The adhesive film may have a thickness of about 5 µm to about 100 µm.

Although not shown in FIG. 1, the adhesive film 140 may be stacked on one side of a liquid crystal display panel to help secure the polarizing plate to the liquid crystal display panel. In an implementation, although not shown in FIG. 1, adhesive layers may be formed between the polarizer 110 and the first protective film 120, and/or between the polarizer 110 and the second protective film 130. The adhesive layers may be formed of an adhesive suitably used for polarizing plates. For example, the adhesive for polarizing plates may include a water-based adhesive including a polyvinyl alcohol resin, and a photocurable adhesive including a (meth)acrylic adhesive resin.

A display device according to an embodiment may include the adhesive film or the polarizing plate as set forth above. The display device may include, e.g., a liquid crystal display including a TFT-LCD, or the like.

Figure 2:
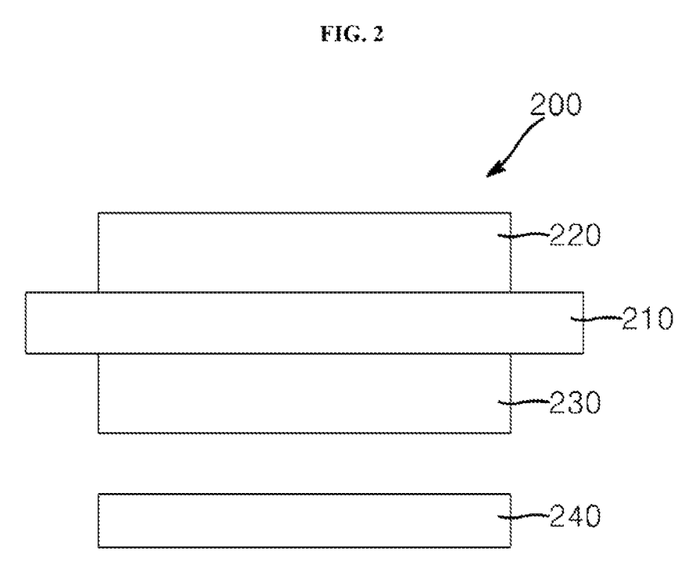
FIG. 2 illustrates a sectional view of an optical display according to an embodiment.

Another embodiment may provide an optical display that includes the adhesive film for polarizing plates as set forth above. Hereinafter, the optical display according to an embodiment will be described in detail with reference to FIG. 2. FIG. 2 illustrates a sectional view of an optical display according to an embodiment.

Referring to FIG. 2, the optical display 200 may include a liquid crystal display panel 210, a first polarizing plate 220 on an upper surface of the liquid crystal display panel 210, and a second polarizing plate 230 on a lower surface of the liquid crystal display panel 210 and between the liquid crystal display panel 210 and a light source 240. For example, the lower surface of the liquid crystal display panel 210 may be a surface thereof that is opposite to the upper surface of the liquid crystal display panel 210.

In an implementation, the light source may include a light emitting diode (LED) light source.

In an implementation, at least one of the first polarizing plate 220 and the second polarizing plate 230 may include the adhesive film for polarizing plates according to an embodiment.

In an implementation, each of the first polarizing plate 220 and the second polarizing plate 230 may have a thickness of about 35 µm to about 500 µm. Within this range, bending of the polarizing plate and the liquid crystal display panel may be suppressed at high temperature. In an implementation, each of the first and second polarizing plates may have a thickness of, e.g., about 75 µm to about 400 µm.

In an implementation, the liquid crystal display panel 210 may have a thickness of about 0.05 mm to about 5 mm. Within this range, even when the liquid crystal display panel is exposed to high temperature, bending of the polarizing plate may be suppressed. For example, the liquid crystal display panel may have a thickness of about 0.1 mm to about 3 mm. In an implementation, the liquid crystal display panel may have a thickness of about, e.g., 0.05 mm, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.5 mm, 3 mm, 3.5 mm, 4 mm, 4.5 mm, or 5 mm.

In an implementation, the liquid crystal display panel 210 may include an upper substrate (not shown), a lower substrate (not shown), and a liquid cell layer (not shown) enclosed between the upper and lower substrates.

The upper and lower substrates may be made of glass or plastic. The plastic substrate may include, e.g., a PET (polyethylene terephthalate) substrate, a PC (polycarbonate) substrate, a PI (polyimide) substrate, a PEN (polyethylene naphthalate) substrate, a PES (polyether sulfone) substrate, a PAR (polyarylate) substrate, and a COC (cycloolefin copolymer) substrate, all of which may be suitably used for flexible displays.

In an implementation, at least one of the upper and lower substrates may be made of glass.

In an implementation, each of the upper and lower substrates may have a thickness of about 0.02 mm to about 3 mm. Within this range, even when the liquid crystal display panel is exposed to high temperature, bending of the polarizing plate may be suppressed. For example, each of the upper and lower substrates may have a thickness of about 0.05 mm to about 1.5 mm. In an implementation, each of the upper and lower substrates may have a thickness of about, e.g., 0.02 mm, 0.05 mm, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.5 mm, or 3 mm.

In an implementation, the liquid cell layer may be a liquid cell layer including liquid crystals arranged in at least one mode selected from among VA (Vertical Alignment) mode, IPS (In Place Switching) mode, FFS (Fringe Field Switching) mode, and TN (Twisted Nematic) mode.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparative Example 1: Preparation of (Meth)Acrylic Copolymer 50 g of ethyl acetate, 10 g of methylethylketone, 85 g of butyl acrylate, 3.0 g of 2-hydroxyethyl methacrylate, 5.0 g of phenoxyethylacrylate, 5.0 g of N-vinylpyrrolidone, and 2.0 g of acrylic acid were provided in a 1 L 4-neck flask, followed by heating the flask to 70° C. and then maintaining the flask at 70° C. As an initiator, 0.05 g of azobisisobutyronitrile was dissolved in 20 g of ethyl acetate and introduced into the flask. The reaction was performed at 65° C. for 3 hours, followed by introducing 170 g of methylethylketone into the flask and then cooling the flask to 40° C., thereby preparing an acrylic copolymer (Mw: 600,000 g/mol, Tg: −40° C., polydispersity index: 5.0).

Preparative Example 2: Preparation of (Meth)Acrylic Copolymer 50 g of ethyl acetate, 10 g of methylethylketone, 65 g of butyl acrylate, 3.5 g of acrylic acid, 15 g of phenoxyethylacrylate, 15 g of N-vinylpyrrolidone, 1.5 g of 2-hydroxyethyl methacrylate were provided in a 1 L 4-neck flask, followed by heating the flask to 70° C. and then maintaining the flask at 70° C. As an initiator, 0.08 g of azobisisobutyronitrile was dissolved in 20 g of ethyl acetate and introduced into the flask. The reaction was performed at 65° C. for 3 hours, followed by introducing 170 g of methylethylketone into the flask and then cooling the flask to 40° C., thereby preparing an acrylic copolymer (Mw: 250,000 g/mol, Tg: −10° C., polydispersity index: 5.0).

Preparative Example 3: Preparation of (Meth)Acrylic Copolymer 20 g of ethyl acetate, 10 g of methylethylketone, 90 g of butyl acrylate, 1.5 g of acrylic acid, 5.0 g of phenoxyethylacrylate, 1.5 g of N-vinylpyrrolidone, 2.0 g of 2-hydroxyethyl methacrylate were provided in a 1 L 4-neck flask, followed by heating the flask to 70° C. and then maintaining the flask at 70° C. As an initiator, 0.02 g of azobisisobutyronitrile was dissolved in 20 g of ethyl acetate and introduced into the flask. The reaction was performed at 65° C. for 3 hours, followed by introducing 170 g of methylethylketone into the flask and then cooling the flask to 40° C., thereby preparing an acrylic copolymer (Mw: 950,000 g/mol, Tg: −46° C., polydispersity index: 5.0).

Example 1

Each of the copolymers prepared in Preparative Examples 1 and 2 was introduced into 18 parts by weight of methylethylketone in amounts as listed in Table 1, below (unit: parts by weight), followed by stirring at 25° C. for 30 minutes, then adding and mixing 4.5 parts by weight of an isocyanate crosslinking agent (modified HDI type, Duranate E405, Asahi KASEI), 0.05 parts by weight of an imide crosslinking agent (V05, Nisshinbo Chemical Inc.), and 0.15 parts by weight of a silane coupling agent (3-glycidoxypropyltrimethoxysilane, KBM-403: Shin-Etsu Chemical Co., Ltd.), thereby preparing an adhesive composition for polarizing plates.

Example 2 and Comparative Examples 1 to 5

Adhesive compositions for polarizing plates and adhesive films for polarizing plates were prepared in the same manner as in Example 1, except that the amounts of the respective components were provided as listed in Table 1 (unit: parts by weight).

TABLE 1

| Items (unit: parts by weight) | | Example 1 | Example 2 | Comparative Example 1 | Comparative Example 2 | Comparative Example 3 | Comparative Example 4 | Comparative Example 5 |
|---|---|---|---|---|---|---|---|---|
| (Meth)-acrylic copolymer | Preparative Example 1 | 25 | 50 | 100 | 0 | 25 | 25 | 25 |
| | Preparative Example 2 | 75 | 50 | 0 | 100 | 75 | 75 | — |
| | Preparative Example 3 | — | — | — | — | — | — | 75 |
| Imide crosslinking agent | | 0.05 | 0.05 | 0.05 | 0.05 | — | 0.05 | 0.05 |
| Isocyanate crosslinking agent | | 4.5 | 4.5 | 4.5 | 4.5 | 4.5 | — | 4.5 |
| Silane coupling agent | | 0.15 | — | 0.15 | 0.15 | 0.15 | 0.15 | 0.15 |

The prepared adhesive compositions for polarizing plates in the Examples and Comparative Examples, and the adhesive films prepared by applying and curing the same were evaluated as to the following properties. Results are shown in Tables 2 and 3, below.

(1) Appearance of coating solution: For the adhesive compositions for polarizing plates prepared in Examples 1 and 2 and Comparative Examples 1 to 5, the appearance of a release film after coating was observed with the naked eye to determine transparency of the film and the presence of defects. "+" indicates that the film was transparent.

(2) Peel strength (gf/25 mm): For the adhesive films for polarizing plates prepared in Examples 1 and 2 and Comparative Examples 1 to 5, 180° peel strength between the adhesive film and a glass substrate was measured in accordance with Japanese Industrial Standard (JIS) 2107. In particular, the adhesive composition was cured under conditions of 35° C./45% RH to prepare a sample. The sample was cut into 25 mm×100 mm (width×length) specimens, which were stacked on the glass substrate. Peel strength was measured using a tensile tester (e.g., a texture analyzer). The adhesive film and the glass substrate of each of the specimens were respectively connected to upper and lower jigs in a 30 kgf load cell. Then, peeling was performed at a tensile speed of 300 mm/min and load was measured.

(3) Modulus: Each of the adhesive compositions for polarizing plates prepared in Examples 1 and 2 and Comparative Examples 1 to 5 was applied to a release film (polyethylene terephthalate film), followed by curing under conditions of 35° C./45% RH to prepare a 25 μm thick adhesive film for polarizing plates, several of which were stacked one above another to form a 0.8 mm thick adhesive film specimen. Modulus of the specimen was measured using a rheometer ARES (Advanced Rheometry Expansion System, TA instrument) by temperature sweep testing (strain 5%, normal force 100 N) at a temperature from 25° C. to 120° C. and a frequency of 1 Hz.

(4) Reworkability and Cutability: Each of 400 mm×250 mm (width×length) polarizing plates coated with the adhesives prepared in Examples 1 and 2 and Comparative Examples 1 to 5 was cut using a Thomson cutter, and the cross-section of an adhesive layer was observed. The polarizing plate was attached to a glass substrate and pressed under a pressure of 4 kg/cm² to 5 kg/cm² to prepare a specimen. The specimen was left at 70° C. for 6 hours and observed to determine whether residues of the adhesive remained on the glass substrate while reworking at ambient temperature for at least 1 hour with slow cooling.

O: No residue of the adhesive on the cut surface (no residue upon rework)

Δ: Slight residue of the adhesive on the cut surface (slight residue upon rework)

X: Much residue of the adhesive on the cut surface (much residue upon rework)

(5) Reliability: Each of polarizing plates coated with the adhesive films prepared in Examples 1 and 2 and Comparative Examples 1 to 5 was cut into 100 mm×175 mm (width×length) specimens, which were attached to a glass substrate and then pressed under a pressure of 4 kg/cm² to 5 kg/cm². After leaving the specimens under conditions of 60° C. and 95% RH for 500 hours (moist-heat resistance), occurrence of bubbling or peeling was observed. After leaving the specimens at 85° C. for 500 hours (heat resistance), occurrence of bubbling or peeling was observed. After 200 cycles (1 cycle: leaving the specimen at a temperature from −45° C. to 60° C.) (thermal shock), occurrence of bubbling or peeling was observed. Then, all of the specimens were left at ambient temperature for at least 1 hour, and then observed with the naked eye or with a microscope.

O: Neither bubbling nor peeling

Δ: Slight bubbling or peeling

Figure 3:
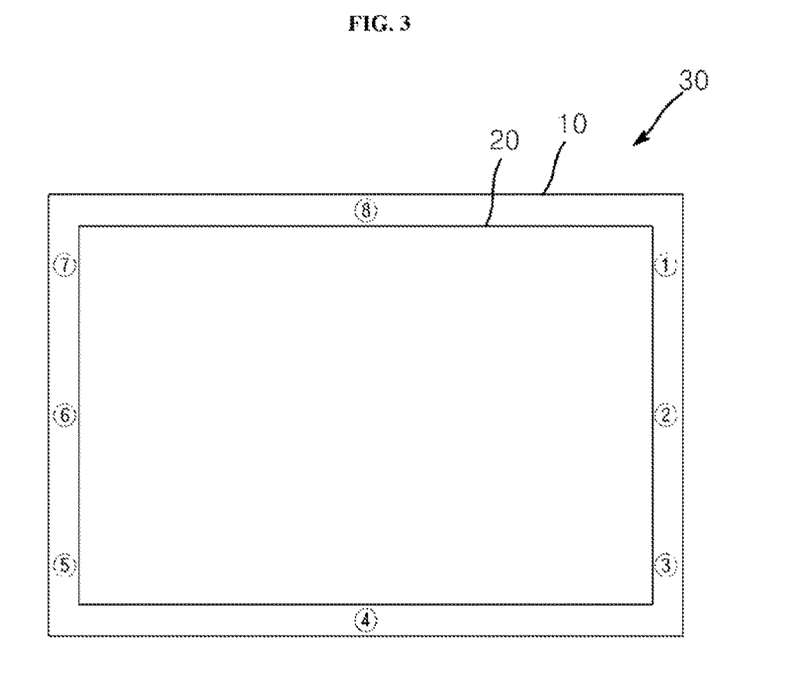
FIG. 3 illustrates measurement points for detecting bending of samples in Experimental Examples.
Figure 4:
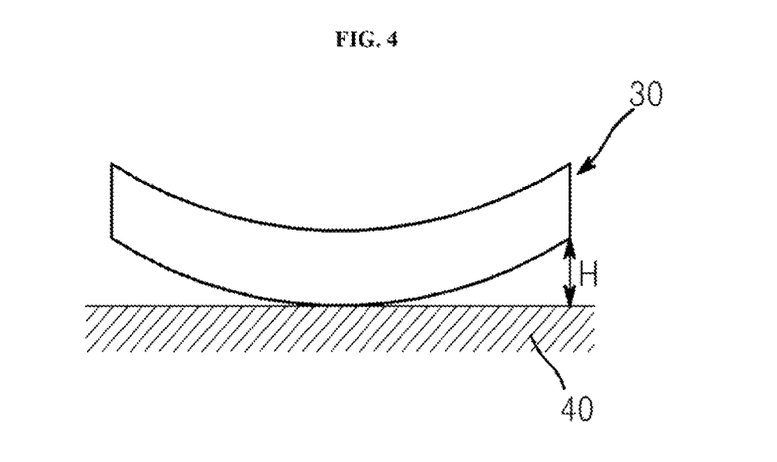
FIG. 4 illustrates a conceptual view of bending in Experimental Examples.

X: Bubbling or peeling (6) Bending: A triacetyl cellulose film/polarizer/triacetyl cellulose film/adhesive film for polarizing plates were sequentially stacked one above another to prepare a sample, which was cut into a 400 mm×250 mm (width×length) polarizing plate specimen using a Thomson cutter. FIG. 3 shows measurement points for detecting bending of samples in the Examples and Comparative Examples. Referring to FIG. 3, the prepared polarizing plate specimen 10 was attached to a 0.5 T thick glass substrate 20, thereby preparing a specimen for detecting bending 30. The specimen 30 was left at 85° C. for 100 hours, slowly cooled for at least 1 hour, and then secured to a stone surface plate, followed by measuring heights of the sample at 8 points (①-⑧) using Vernier calipers to calculate average and maximum values of the measured heights at the respective points. FIG. 4 illustrates a conceptual view of bending in the Examples and Comparative Examples. Bending H means a height H at which the degree of bending of the specimen for detecting bending away from a floor 40 was the maximum.

TABLE 2

| Evaluation Item | | Examples | | Comparative Examples | | | | |
|---|---|---|---|---|---|---|---|---|
| | | 1 | 2 | 1 | 2 | 3 | 4 | 5 |
| Appearance of coating solution | | + | + | + | + | + | + | + |
| Peel strength(gf/25 mm) | | 320 | 315 | 340 | 340 | 390 | 852 | 320 |
| Modulus | 25° C. | 1.07E5 | 7.65E4 | 6.62E4 | 3.20E5 | 8.45E4 | 8.23E4 | 9.84E4 |
| (Pa) | 85° C. | 2.95E4 | 3.23E4 | 4.21E4 | 1.72E4 | 1.25E4 | 1.13E4 | 7.21E4 |
| | ΔG' (%) | 72 | 58 | 36 | 95 | 85 | 86 | 26 |
| Reworkability and Cutability | | ○ | ○ | ○ | Δ | Δ | x | ○ |
| Reliability | Heat resistance(85° C.) | ○ | ○ | ○ | x | Δ | x | ○ |
| | Moist heat resistance (60° C., 95% RH) | ○ | ○ | ○ | x | x | x | ○ |
| | Thermal shock (−40° C. → 65° C.) | ○ | ○ | ○ | x | x | x | ○ |

TABLE 3

| | Bending value according to measuring point (mm) | | | | | | | | Calculated bending value(mm) | | |
|---|---|---|---|---|---|---|---|---|---|---|---|
| | ① | ② | ③ | ④ | ⑤ | ⑥ | ⑦ | ⑧ | Average | Total value | Maximum |
| Example 1 | 0.45 | 0 | 0 | 0 | 0 | 0 | 0.71 | 0 | 0.1 | 1.16 | 0.71 |
| Example 2 | 0 | 0 | 0 | 0.25 | 0 | 0 | 0 | 0.25 | 0.1 | 0.5 | 0.25 |
| Comparative Example 1 | 1.65 | 2.6 | 1.0 | 0 | 1.94 | 2.45 | 2.16 | 0 | 1.48 | 11.8 | 2.45 |
| Comparative Example 2 | 0.1 | 0 | 0.18 | 0 | 0 | 0.22 | 0 | 0 | 0.06 | 0.5 | 0.22 |
| Comparative Example 3 | 0 | 0.28 | 0 | 0 | 0.12 | 0.1 | 0 | 0 | 0.06 | 0.5 | 0.28 |
| Comparative Example 4 | 0 | 0.2 | 0 | 0 | 0.1 | 0 | 0.2 | 0 | 0.06 | 0.5 | 0.2 |
| Comparative Example 5 | 1.85 | 2.4 | 1.8 | 0.8 | 2.16 | 2.46 | 2.10 | 0.9 | 1.8 | 14.47 | 2.46 |

As may be seen in Tables 2 and 3, the adhesive film for polarizing plates according to the Examples exhibited peel strength within a predetermined range at ΔG' from 50% to 80%, had excellent reworkability/cutability, and excellent reliability under heat resistance, moist-heat resistance, or thermal shock conditions, while reducing bending after being left at high temperature.

Conversely, the adhesive film of Comparative Example 1, which included only one type of (meth)acrylic copolymer, exhibited excellent durability and cutability, but had a problem in terms of bending. In addition, the adhesive film of Comparative Example 2, which also included only one type of (meth)acrylic copolymer, exhibited excellent properties in terms of bending, but had poor durability and cutability. Further, the adhesive film of Comparative Example 3, which included a blend of (meth)acrylic copolymers and did not include an imide crosslinking agent, exhibited poor durability due to the insufficient degree of curing. The adhesive film of Comparative Example 4, which included a blend of the (meth)acrylic copolymers and did not include an isocyanate crosslinking agent, exhibited poor durability due to the insufficient degree of cure. Further, the adhesive film of Comparative Example 5, which included a (meth)acrylic copolymer having a high weight average molecular weight and a low glass transition temperature, exhibited poor properties in terms of bending.

By way of summation and review, in order to stably secure the polarizing plate to the panel, an adhesive film may exhibit excellent durability under heat resistance or moist-heat resistance conditions. To help improve durability of the adhesive film, the degree of cross-linking of the adhesive film may be increased, or an adhesive resin having a weight average molecular weight of about 1,000,000 g/mol or more may be used.

When a panel employing a thin glass substrate is used, the polarizing plate and the panel may bend due to contraction of the polarizing plate at high temperature when the polarizing plate is adhered to the panel. One method for increasing durability may have a limitation in absorption of the contraction of the polarizing plate. Reducing modulus of the adhesive film to suppress bending may cause deterioration in durability of the adhesive film. An adhesive film for polarizing plates may have high durability and may suppress bending of the adhesive film at high temperature. An acrylic adhesive composition may be used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive film for polarizing plates, the adhesive film:
being prepared from an adhesive composition including an isocyanate crosslinking agent, an imide crosslinking agent, a first (meth)acrylic copolymer, and a second (meth)acrylic copolymer, and
having a ΔG' of about 50% to about 80%, ΔG' being represented by Equation 1:

$$\Delta G' = (G1 - G2)/G1 \times 100 \quad \text{[Equation 1]}$$

wherein G1 is a storage modulus of the adhesive film for polarizing plates as measured at 25° C., and G2 is a storage modulus of the adhesive film for polarizing plates as measured at 85° C., and
wherein:
the isocyanate crosslinking agent and the imide crosslinking agent are included together in the composition in an amount of 1.1 parts by weight to 6 parts by weight, based on 100 total parts by weight of the first (meth)acrylic copolymer and the second (meth)acrylic copolymer,
the first (meth)acrylic copolymer is a copolymer of a monomer mixture including:
about 65 wt % to about 90 wt % of an alkyl group-containing (meth)acrylic monomer,
about 0.1 wt % to about 5 wt % of a hydroxyl group-containing (meth)acrylic monomer,
about 1 wt % to about 15 wt % of an aromatic group-containing (meth)acrylic monomer, and
about 1 wt % to about 20 wt % of a nitrogen-containing vinyl monomer, and
the second (meth)acrylic copolymer is a copolymer of a monomer mixture including:
about 50 wt % to about 90 wt % of an alkyl group-containing (meth)acrylic monomer,
about 0.1 wt % to about 5 wt % of a hydroxyl group-containing (meth)acrylic monomer,
about 1 wt % to about 20 wt % of an aromatic group-containing (meth)acrylic monomer, and
about 1 wt % to about 20 wt % of a nitrogen-containing vinyl monomer.

2. The adhesive film as claimed in claim 1, wherein G2 of the adhesive film is about $1.0 \times 10^4$ Pa to about $1.0 \times 10^5$ Pa.

3. The adhesive film as claimed in claim 1, wherein G2 of the adhesive film is about $2.5 \times 10^4$ Pa to about $4.0 \times 10^4$ Pa.

4. The adhesive film as claimed in claim 1, wherein the isocyanate crosslinking agent includes a modified polyisocyanate of hexamethylene diisocyanate.

5. The adhesive film as claimed in claim 1, wherein the imide crosslinking agent includes an isocyanate group.

6. The adhesive film as claimed in claim 1, wherein:
the first (meth)acrylic copolymer has:
a weight average molecular weight of about 300,000 g/mol to about 700,000 g/mol, and
a glass transition temperature (Tg) of about −50° C. to about −40° C.; and
the second (meth)acrylic copolymer has:
a weight average molecular weight of about 100,000 g/mol to about 300,000 g/mol, and
a glass transition temperature (Tg) of about −10° C. to about 0° C.

7. The adhesive film as claimed in claim 6, wherein, when the glass transition temperature of the first (meth)acrylic copolymer in Kelvin is X and the glass transition temperature of the second (meth)acrylic copolymer in Kelvin is Y, (Y−X)/Y is about 0.1 to about 0.15.

8. The adhesive film as claimed in claim 6, wherein a difference between the weight average molecular weight of the first (meth)acrylic copolymer and the weight average molecular weight of the second (meth)acrylic copolymer is about 50,000 g/mol to about 500,000 g/mol.

9. The adhesive film as claimed in claim 6, wherein the adhesive composition further includes an epoxy group-containing silane coupling agent.

10. The adhesive film as claimed in claim 1, wherein:
the monomer mixture of the first (meth)acrylic copolymer further includes (meth)acrylic acid, and
the monomer mixture of the second (meth)acrylic copolymer further includes (meth)acrylic acid.

11. The adhesive film as claimed in claim 10, wherein:
the first (meth)acrylic copolymer has an acid value from about 1.5 mg/KOH to about 5.0 mg/KOH, and
the second (meth)acrylic copolymer has an acid value from about 1.5 mg/KOH to about 5.0 mg/KOH.

12. A polarizing plate comprising the adhesive film for polarizing plates as claimed in claim 1.

13. An optical display, comprising:
a liquid crystal display panel;
a light source;
a first polarizing plate on one surface of the liquid crystal display panel; and
a second polarizing plate on another surface of the liquid crystal display panel, the second polarizing plate being between the liquid crystal display panel and the light source,
wherein:
the liquid crystal display panel includes an upper substrate, a lower substrate, and a liquid crystal cell layer enclosed between the upper and lower substrates,
the liquid crystal display panel has a thickness of about 0.05 mm to about 5 mm, and
at least one of the first polarizing plate and the second polarizing plate includes the adhesive film for polarizing plates as claimed in claim 1.

14. A method of manufacturing optical display, the method comprising:
providing a liquid crystal display panel;
providing a light source at one side of the liquid crystal display panel;
providing a first polarizing plate on one surface of the liquid crystal display panel; and
providing a second polarizing plate on another surface of the liquid crystal display panel, the second polarizing plate being between the liquid crystal display panel and the light source,
wherein at least one of the first polarizing plate and the second polarizing plate includes the adhesive film for polarizing plates as claimed in claim 1.

* * * * *